United States Patent [19]
Peters

[11] Patent Number: 5,693,234
[45] Date of Patent: Dec. 2, 1997

[54] METHOD FOR PRODUCING AT LEAST ONE RECESS IN A SURFACE OF A SUBSTRATE APPARATUS FOR CARRYING OUT THE SAID METHOD AND USE OF THE PRODUCT THUS OBTAINED

[75] Inventor: Dethard Peters, Höchstadt, Germany

[73] Assignee: Siemens Aktiengesellschaft, München, Germany

[21] Appl. No.: 640,972

[22] PCT Filed: Oct. 28, 1994

[86] PCT No.: PCT/DE94/01274

§ 371 Date: May 10, 1996

§ 102(e) Date: May 10, 1996

[87] PCT Pub. No.: WO95/13525

PCT Pub. Date: May 18, 1995

[30] Foreign Application Priority Data

Nov. 11, 1993 [DE] Germany .................... 43 38 575.3

[51] Int. Cl.[6] .................................................. H01L 21/3065
[52] U.S. Cl. .................... 216/2; 216/41; 216/67; 156/643.1; 156/662.1
[58] Field of Search ................ 216/2, 41, 51, 216/67

[56] References Cited

U.S. PATENT DOCUMENTS

| | | |
|---|---|---|
| 4,764,249 | 8/1988 | Gobrecht et al. ............... 156/643 |
| 4,945,769 | 8/1990 | Sidner et al. ..................... 73/727 |
| 4,975,390 | 12/1990 | Fuji et al. ........................ 437/228 |
| 4,993,143 | 2/1991 | Sidner et al. .................... 29/621.1 |
| 5,366,115 | 11/1994 | Kersten et al. .................. 222/105 |
| 5,389,198 | 2/1995 | Koide et al. ..................... 156/651 |
| 5,552,015 | 9/1996 | Arndt et al. ........................ 216/2 |

FOREIGN PATENT DOCUMENTS

| | | |
|---|---|---|
| 2029332 | of 0000 | Canada . |
| 61-161431 | 7/1986 | Japan . |
| WO 90/04701 | 5/1990 | WIPO . |
| WO 93/17440 | 9/1993 | WIPO . |

OTHER PUBLICATIONS

Landolt, Börnstein: *Numerical Data and Functional Relationship in Science & Technology* Group 3—Crystal & Solid State Physics, vol. 17, Semiconductors, Subvolume c, Technology of Si, Ge and SiC, pp. 319–321, 326–328, 566–567.

Primary Examiner—R. Bruce Breneman
Assistant Examiner—Michael E. Adjodha
Attorney, Agent, or Firm—Kenyon & Kenyon

[57] ABSTRACT

With the proposed method, a masking device (5) with an aperture (6) is placed on the substrate (8), the masking device (5) and the region to be etched (90) on the substrate surface (9) forming a hollow chamber (11) which communicates with the reaction chamber (4) only via the aperture (6). The recess (10) is produced with the aid of corrosive radicals produced in the reaction chamber. In this way, a recess (10) with a smooth and precisely adjustable depth contour is obtained.

13 Claims, 3 Drawing Sheets

METHOD FOR PRODUCING AT LEAST ONE RECESS IN A SURFACE OF A SUBSTRATE APPARATUS FOR CARRYING OUT THE SAID METHOD AND USE OF THE PRODUCT THUS OBTAINED

BACKGROUND OF THE INVENTION

The invention concerns a method for producing at least one recess in a surface of a substrate, an apparatus for carrying out the said method, and a use of the substrate with the recess produced with the method.

Membranes are used in many technical fields. One important area of application is sensor technology, in which the deflection or vibration of a membrane is utilized to measure a physical quantity. Examples of this are noise sensors or pressure sensors, made in most cases of silicon. An important consideration in all applications is that the membrane can be destroyed by excessive impact or pressure effects in the event of overload. This is particularly the case when the membrane consists of a relatively brittle material such as silicon. To protect the membrane against overload, a shaped bed against which the membrane can rest in the event of overload is generally provided.

Several methods for producing such shaped beds, in which a recess is produced in a flat surface of a substrate, are known.

In a first method, a recess with a trapezoidal contour is produced in the (100) surface of a silicon substrate by anisotropic wet etching with potassium hydroxide (KOH). In the event of overload, the membrane rests against the center region of the flat bottom of the recess. The support function of the shaped bed can therefore be effective only in this small center region, so that the membrane can be destroyed by further stress.

A second possibility for manufacturing such shaped beds consists in producing a recess with a stepped contour in a silicon substrate by means of a plurality of lithography steps, carried out successively with photoresist masks of increasing diameter. The contour of the recess can be approximated to a smooth curve by increasing the number of lithography steps (WO 90/04701, in particular FIG. 3). Setback areas still remain, however, and are problematic because of their notch effect. In addition the method is complex because of the many process steps, and requires precise alignment of the etching masks for each lithography step.

A shaped bed can also be produced with gray-area lithography. With this third method a mask with a gray zone that becomes lighter toward the center of the desired recess is required for the substrate. Lithography then produces, under suitable exposure conditions, a resist contour with a thickness that decreases toward the center. When the substrate is then etched, the resist mask recedes and exposes more and more substrate surface. One disadvantage of this manufacturing method is that the resist mask can be made to recede up to, at best, a magnitude of 10 to 20 µm. The method therefore cannot be used if the diameter of the shaped bed is to be substantially greater than its depth.

A fourth possibility for manufacturing the shaped bed is mechanical machining of the substrate by turning, milling, grinding, polishing, or blasting. With contour depths of a few µm, the precision of this method is insufficient.

Etching methods referred to as "dry etching" are known for etching of substrate surfaces. The characteristic feature of such dry etching processes is the chemical reaction of radicals or ions of an etching gas with the substrate surface to form a volatile reaction product. The chemical reaction can be spontaneous, or induced by ions, electrons, or photons. The etching gas radicals are generally produced in a low-pressure plasma, typically between $10^{-1}$ and $10^{-3}$ Pa. In such cases reactive dry etching is therefore often also referred to as "plasma etching." The plasma can be produced by a high-frequency electromagnetic field that is either applied to electrodes or supplied directly as microwaves. Several types of plasma reactors are known for carrying out the dry etching process. All the types have a receptacle in which the substrate to be etched is arranged, and that is equipped with connectors for evacuation and for supplying the etching gas. In a first reactor type, called a tunnel reactor or barrel reactor, a perforated hollow cylindrical shield forming a tunnel is provided inside a casing that is preferably made of quartz. The shield is surrounded on opposite sides by electrodes that are approximately semicircular in cross section. A high-frequency electromagnetic field is applied to the electrodes by means of a high-frequency generator. Inside the shield, the substrate to be etched is arranged on a "boat." The shield prevents charged particles (electrodes, ions) from reaching the substrate. In a second type of reactor, the substrate is arranged on the flat surface of an electrode arranged in the receptacle. In a first known embodiment, the electrode with the substrate can then be grounded, and a further flat electrode that is electrically connected to the high-frequency generator can be arranged in the receptacle parallel to the electrode with the substrate. In another known embodiment, the electrode with the substrate is itself connected to the high-frequency generator, and the second electrode is grounded. The casing of the receptacle can, however, also be grounded, and thus provided as the second electrode. In a third type of reactor the gas radicals are produced in a plasma chamber by means of microwaves, and conveyed via a supply conduit into an etching chamber in which the substrate to be etched is arranged. A survey of these and other known reactor types, and various embodiments of dry etching methods, is provided by the book by Landolt-Börnstein entitled "Numerical Data and Functional Relationship in Science and Technology Group 3—Crystal and Solid State Physics, Vol. 17, Semiconductors, Subvolume c, Technology of Si, Ge, and SiC," Tokyo 1984, Springer-Verlag, pages 319 to 321, 326 to 328, and 566 and 567.

SUMMARY OF THE INVENTION

It is the object of the invention to indicate a method for producing at least one recess in a surface of a substrate. The recess is to be precisely and reproducibly adjustable in its depth and its lateral dimensions, and to have a smooth depth contour. The substrate with the recess is to be usable as a shaped bed for a membrane. An apparatus for carrying out the method is also to be indicated.

In a dry etching process, the masking device is first placed or applied onto the substrate surface to be etched. The masking device covers the region of the substrate surface in which the recess is to be produced. The masking device and the substrate surface thereby form a hollow chamber that communicates with the reaction chamber only by one aperture in the masking device. During etching, the etching radicals present in the reaction chamber can therefore reach the region of the substrate surface to be etched only through the aperture in the masking device. As a result, however, the etching rate in this region to be etched is dependent on location. Specifically, since the etching radicals move largely in straight lines, the etching rate at a location inside the surface region to be etched is proportional, to a good approximation, to the solid angle at which the surface of the reaction chamber can be viewed from that location through the aperture of the masking device. The etching rate is at a maximum in a center of the surface region to be etched, directly beneath the aperture of the masking device, and continuously decreases outward toward the edges. The smooth, i.e. continuously differentiable, change in the solid angle is thus directly reflected in the etch rate and thus in the etching contour. A recess with a smooth, gentle etching contour is thus created.

Advantageous embodiments according to the invention are evident from the subclaims.

BRIEF DESCRIPTION OF THE DRAWINGS

For further explanation, reference is made to the drawings, in which, schematically in each case.

Corresponding parts are assigned the same reference symbols.

DETAILED DESCRIPTION OF THE INVENTION

Figure 1:
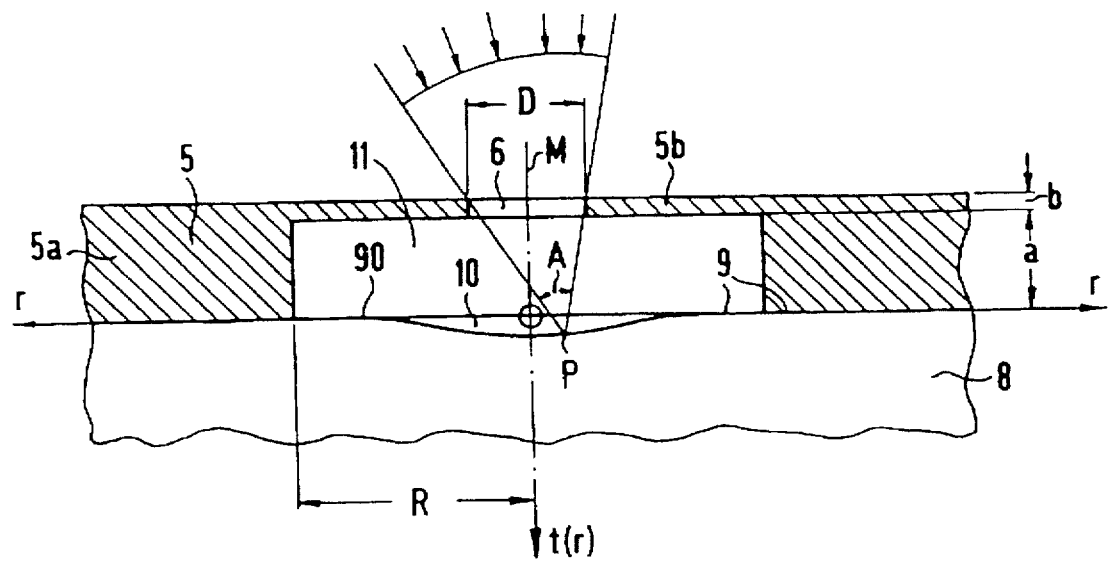
FIG. 1 depicts a substrate with a masking device placed on it, in cross section.

The designations in FIG. 1 are 8 for a substrate; 9 for its surface; 90 for a region of surface 9; 10 for a recess in surface 9 located in said region 90; P for a point on the bottom of said recess 10; 5 for a cup-shaped masking device with a pedestal-shaped side part 5a and a cover part 5b; 6 for an aperture in said masking device in cover part 5b; D for the diameter of said aperture; b for the depth of said aperture 6 corresponding to the thickness of cover part 5b; M for a center axis of aperture 6; a for the distance between aperture 6 and surface 9 of substrate 8; 11 for a hollow cavity enclosed by masking device 5 and substrate surface 9; 4 for a reaction chamber located beyond hollow chamber 11 on the other side of aperture 6; and A for a solid angle section viewed from point P through aperture 6. Masking device 5 is closed at the top except for aperture 6, and open at the bottom. With its annularly closed pedestal part 5a, masking device 5 is either placed in prefabricated form, or applied by growing and structuring corresponding layers, onto surface 9 of substrate 8 and generally removed after the recess has been produced. In the advantageous embodiment depicted, substrate surface 8 to be etched is flat, and aperture 6 in the applied masking device 5 is oriented parallel to surface 9. The shape of aperture 6 is then transferred in defined unsharp form to the shape of the resulting recess 10. With a rectangular aperture 6, for example, recess 10 will be substantially rectangular, and with a round aperture 6 substantially round.

Surface 9 of substrate 8 can, however, also be curved in any fashion. Masking device 5 must then be adapted in accordance with surface 9. Aperture 6 can also be inclined with respect to surface 9 of substrate 8. An asymmetrical depth contour of recess 10 will then be obtained.

In the embodiment depicted, an incoming flow of etching gas radicals from reaction chamber 4 through aperture 6 onto surface 9 creates, during the dry etching process, a recess 10 in substrate surface 9 whose depth contour t(r) corresponds, to a very good approximation, to the deflection of a membrane.

Figure 2:
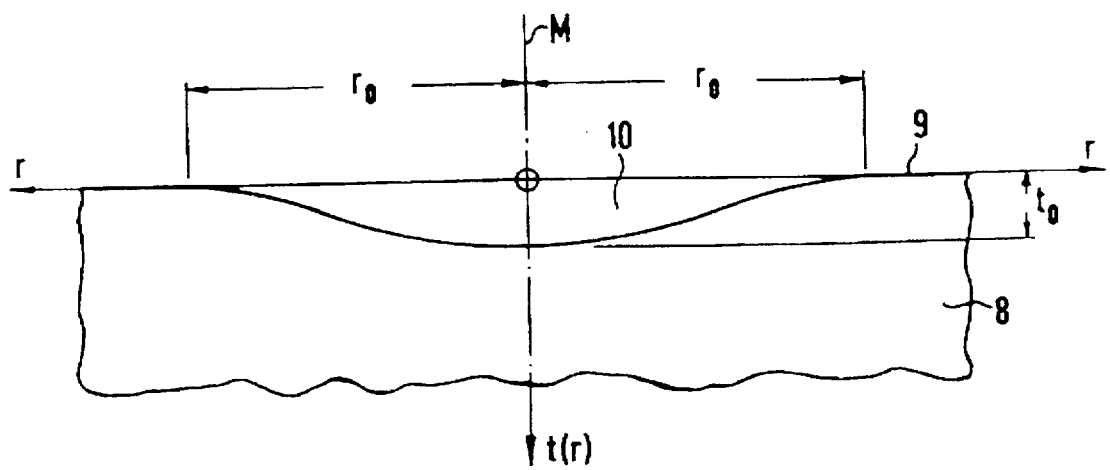
FIG. 2 depicts the depth contour of a recess in the substrate surface after removal of the masking device.

This depth contour t(r) is depicted again in FIG. 2 in more detail for a round recess 10. It can be described by the fourth-order equation $t(r) \, t_0 \, ((r/r_0)^2-1)^2$. $r_0$ is the maximum radius of recess 10 with reference to center axis M of aperture 6 in masking device 5, which has already been removed and is therefore no longer depicted in FIG. 2. Maximum radius $r_0$ depends on diameter D and depth b of aperture 6 and its distance a from surface 9 of substrate 8. Thus if the lateral edge of hollow chamber 11, which is determined by the side walls of masking device 5, lies closer to center axis M, in a radial direction, than maximum radius $r_0$, the depth contour therefore breaks off at that point on the edge. The actual radius of recess 10 is then only as great as the distance (labeled R) from the edge of the hollow chamber to center axis M. Recess 10 has its maximum depth $t_0$ along center axis M. This maximum depth $t_0$ can be adjusted by way of the etching time.

In all embodiments, etching of recess 10 requires the availability of etching gas radicals in reaction chamber 4. These etching gas radicals react chemically with the material of substrate 8 to form a gaseous, volatile reaction product. Halogen compounds are typically used as the etching gas because of the high reactivity of halogen radicals, especially fluorine and chlorine radicals. All substrate materials for which suitable etching gases exist are etchable. Semiconductor materials such as silicon (Si), germanium (Ge), or silicon carbide (SIC) are preferably provided as materials for substrate 8. Substrates 8 made of metals or insulators can, however, also be etched.

In a particularly advantageous embodiment, the etching gas radicals are produced in a low-pressure plasma. "Low pressure" here is understood to mean a pressure of 0.01 to 1000 Pa, and preferably 0.1 to 100 Pa. The low-pressure plasma can be produced in a plasma chamber separate from reaction chamber 4. The resulting etching gas radicals are then conveyed via a gas conduit into reaction chamber 4. In another embodiment, the low-pressure plasma is produced directly inside reaction chamber 4.

In principle, any known plasma reactor can be used to produce the low-pressure plasma and thereby the etching gas radicals. A survey of current reactor types is provided in the Landolt and Börnstein book cited above, which is to be considered incorporated into the disclosure of the present application.

Figure 3:
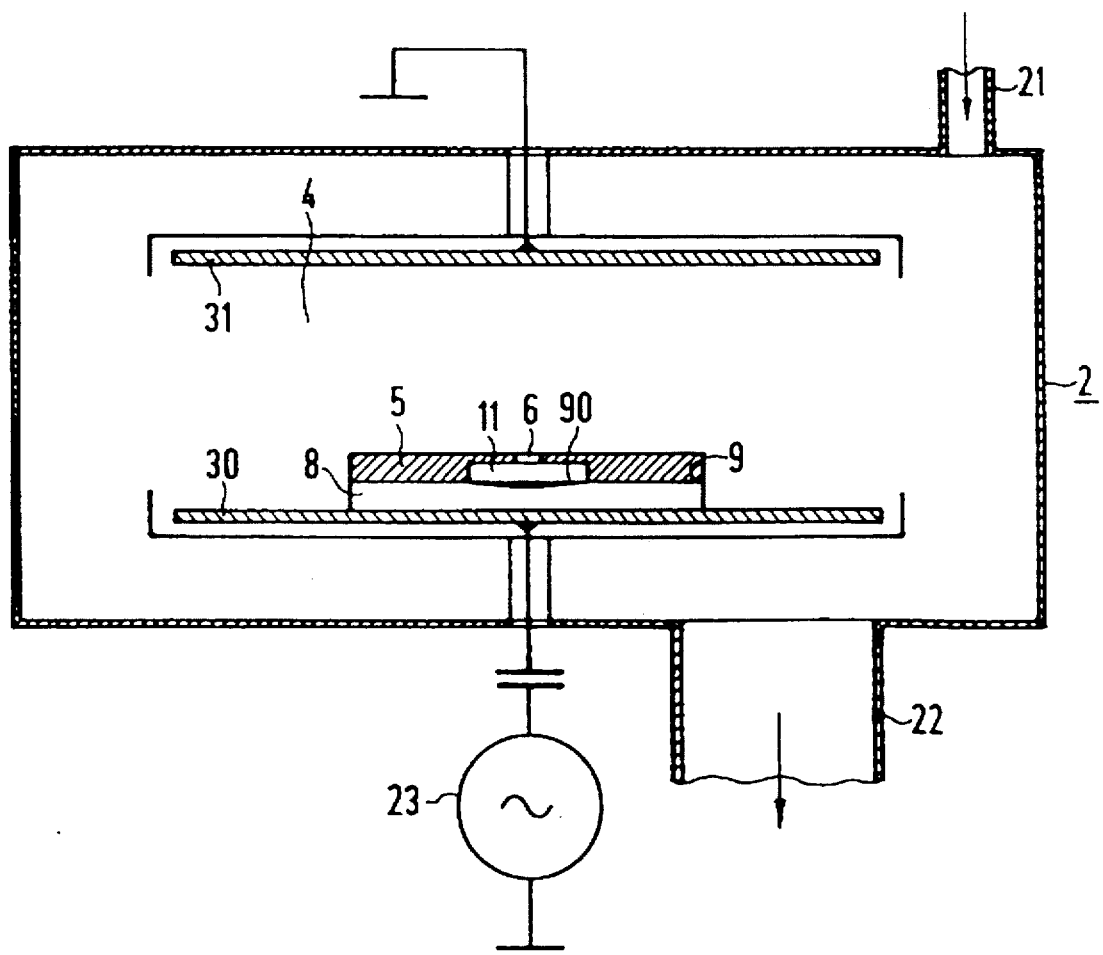
FIG. 3 depicts an embodiment of a dry etching apparatus for producing a recess in a substrate.

FIG. 3 illustrates an exemplary embodiment of an apparatus for carrying out the invention with a parallel plate reactor. Two parallel plates, constituting electrodes 30 and 31, are arranged in a receptacle 2. Reaction chamber 4 lies between electrodes 30 and 31. Substrate 8 with masking device 5 is arranged on the lower electrode 30. Masking device 5 is generally placed on substrate 8 as a whole before substrate 8 is introduced into receptacle 2. Electrode 30 with substrate 8 is connected via a capacitor to a high-frequency generator 23; the other electrode 31 and the casing of receptacle 2 are grounded. Receptacle 2 is evacuated via a suction fitting 22, and supplied with etching gas via a supply fitting 21. A specific low pressure is set, which generally is so low that the mean free path length of the etching gas radicals produced in reaction chamber 4 is greater than the distance a from aperture 6 to substrate surface 9, and at least great enough that the etching gas radicals can traverse hollow cavity 11 to surface 9.

Figure 4:
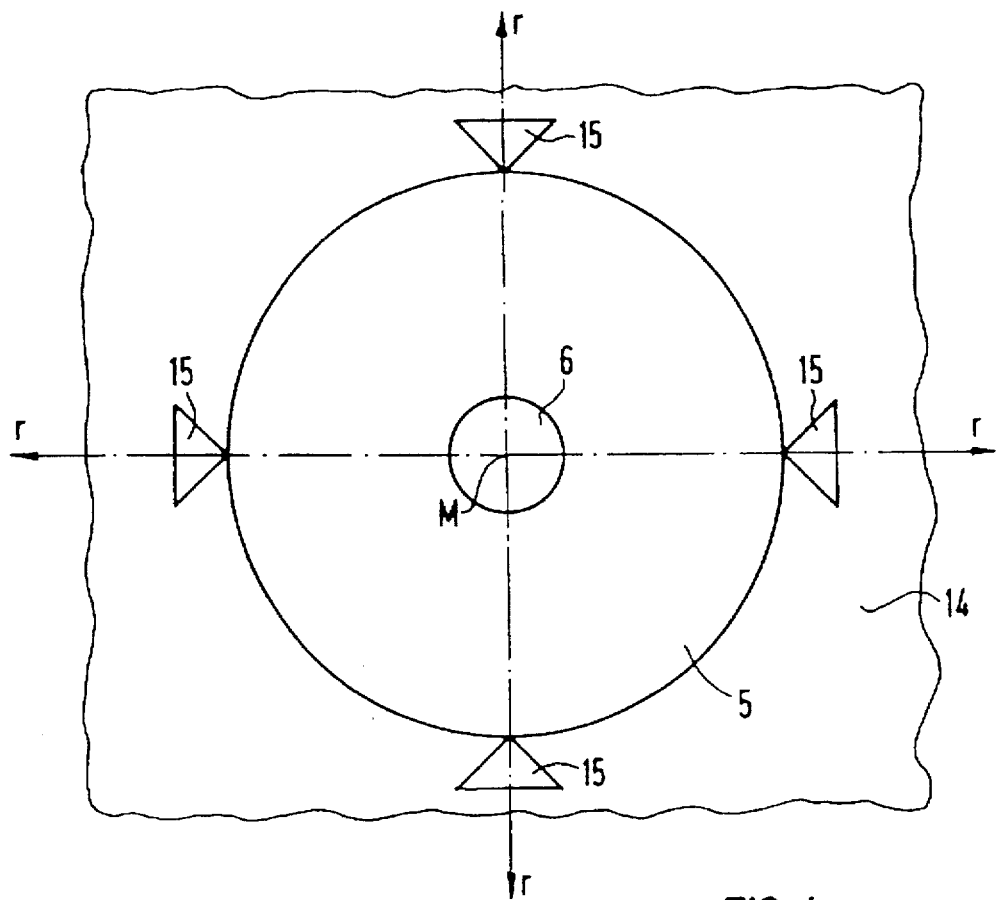
FIGS. 4 and 5 depict an embodiment of an apparatus with a cylindrical masking device and an etch protection layer on the substrate, in plan view and in cross section respectively.
Figure 5:
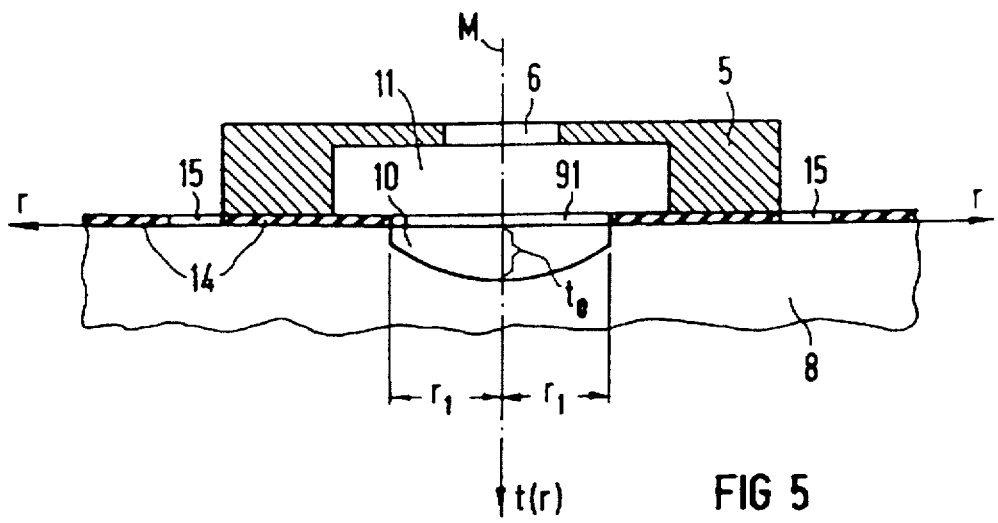

A particularly advantageous embodiment of an apparatus for carrying out the method is depicted in FIGS. 4 and 5, in a plan view and in cross section respectively. An etch protection layer 14 is applied onto surface 9 of substrate 8. This etch protection layer 14 was structured in such a way that a round etch region 91 of surface 9, with radius $r_1$, is exposed, and preferably four alignment marks 15 are produced, radially symmetrical with respect to etch region 91. A cylindrically symmetrical masking device 5 is then placed, like an upended cylindrical cup, onto etch protection layer 14. This cylindrical cup can be manufactured as a turned part, for example from aluminum. Aperture 6, which is round in shape and whose center axis M is identical to the cylindrical axis of the cylindrical cup, is provided in the bottom of the cylindrical cup. Masking device 5 is then aligned with the aid of alignment marks 15, for example manually under a microscope, so that center axis M of its aperture 6 extends perpendicularly through the center point of the round etch region 91. In this embodiment the edge of recess 10 is precisely defined by etch region 91 formed in etch protection layer 14.

For a radius $r_1 < r_0$, the etching depth contour is thus cut off perpendicularly at the edge of etch region 91, i.e. $=t(r)$ $t_0$ $((r/r_0)^2 = -1)^2$ where $r < r_1$, and $t(r) = 0$ where $r \geq r_1$. Etch protection layer 14 can be removed after masking device 5 is lifted off. For a substrate 8 made of Si, an etch protection layer 14 made of, for example, $SiO_2$ is suitable. Substrate 8 can be entirely stripped off afterward using buffered hydrofluoric acid.

Typical dimensions for recess 10 are preferably approximately 10 μm to 1 mm for its lateral dimensions, in particular $r_0$ or $r_1$ or R, and preferably approximately 5 μm to 50 μm for its maximum depth $t_0$.

In an embodiment that is not depicted, a masking device 5 with a plurality of apertures can be provided. The depth contour of recess 10 then results from the overlap (convolution integral) of the individual contours for individual apertures 6, if apertures 6 are located close enough to one another. If the distances between apertures 6 are sufficiently large, this masking device 5 can be used to produce a plurality of recesses 10 with the individual depth contours of the corresponding apertures 6. It is also possible to place or apply a plurality of masking devices 5 next to one another onto a surface 9 of a substrate 8.

Metals, for example aluminum (Al), iron (Fe), nickel (Ni), titanium (Ti), molybdenum (Mo), or chromium (Cr), are preferably to be selected as the material for masking device 5.

What is claimed is:

1. A method for producing a shaped bed for a membrane of a pressure sensor, in which a recess (10) having a ridgeless profile is etched in a surface (9) of a homogeneous substrate (8) to form the shaped bed, comprising the steps of:
   a) using a semiconductor material as the substrate (8),
   b) arranging the substrate (8) in a reaction chamber (4),
   c) arranging a masking device (5) with at least one aperture (6) on a surface (9) of the substrate (8) in such a way that a hollow chamber (11) which communicates with reaction chamber (4) via the at least one aperture (6) is formed below the masking device (5), wherein the hollow chamber (11) of the masking device (5) extends outward on the surface (9) of the substrate (8) further than the recess (10) to be etched, and
   d) providing etching radicals in the reaction chamber (4) that react chemically with the semiconductor material of the substrate (8) to form a volatile reaction product.

2. The method according to claim 1, further comprising the steps of applying an etch protection layer (14) onto the surface (9) of the substrate (8), and removing said etch protection layer (14), before application of the masking device (5), in an etch region (91) of the surface (9) in which the recess (10) is to be produced.

3. The method according to claim 2, further comprising the step of producing alignment marks (15) in the etch protection layer (14) for aligning the masking device (5).

4. The method according to claim 1, wherein the etching gas radicals are produced in a low-pressure plasma.

5. The method according to claim 1, wherein the masking device (5) is placed in prefabricated form onto the surface (9) of the substrate (8).

6. The method according to claim 1, wherein the aperture (6) of the masking device (5) is arranged, after application of the masking device (5), at a predefined distance (a) parallel to the region (90) of the surface (9) in which the recess (10) is to be produced.

7. The method according to claim 6, wherein after application of the masking device (5), the aperture (6) is located above a center of the region (90).

8. The method according to claim 6, wherein the masking device (5) has a cylindrical cup shape, the aperture (6) is circular in shape, and the center axis (M) of the aperture (6) coincides with the cylindrical axis of the cylindrical cup.

9. The method according to claim 6, wherein the aperture (6) is of rectangular shape.

10. The method according to claim 6, wherein the masking device (5) is metal.

11. A shaped bed for a membrane, produced according to the method of claim 1.

12. A shaped bed for a membrane, comprising a substrate (8) and a round recess (10) in a surface (9) of the substrate (8), wherein the recess (10) has a depth contour t(r) adjusted in accordance with the equation $$t(r) = t_0 \, ((r/r_0)^2 - 1)^2$$

where r is the radial distance from a center axis (M), $r_0$ is the maximum radius of the recess (10), and $t_0$ is the maximum depth of the recess (10).

13. A method for producing a shaped bed for a membrane, comprising the steps of:
   a) arranging a substrate (8) in a reaction chamber (4);
   b) producing a recess (10) in a surface (9) of the substrate (8) by placing a masking device (5) with at least one aperture (6) onto the surface (9) of the substrate (8) in such a way that after placement a hollow chamber (11) that communicates with the reaction chamber (4) only via the aperture (6) is created between the region (90) of the surface (9) in which the recess (10) is to be produced, and the masking device (5); and by providing etching gas radicals in the reaction chamber (4), the etching gas radicals being capable of reacting chemically with the material of the substrate (8) to form a volatile reaction product;
   c) applying an etch protection layer (14) onto the surface (9) of the substrate (8), and removing said etch protection layer (14), before application of the masking device (5), in an etch region (91) of the surface (9) in which the recess (10) is to be produced; and
   d) producing alignment marks (15) in the etch protection layer (14) for aligning the masking device (5);
   wherein substrate (8) having recess (10) is produced which can be used as a shaped bed for the membrane.

* * * * *